No. 879,882. PATENTED FEB. 25, 1908.
A. F. MISCHKE.
PRUNING SHEARS.
APPLICATION FILED NOV. 27, 1907.
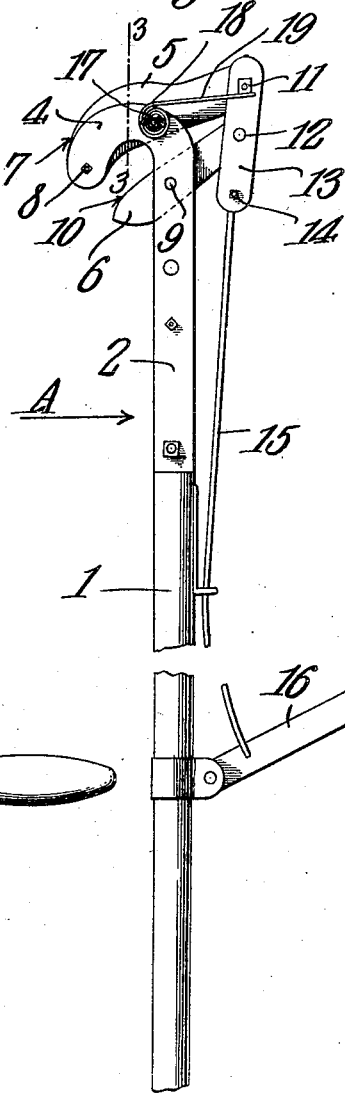
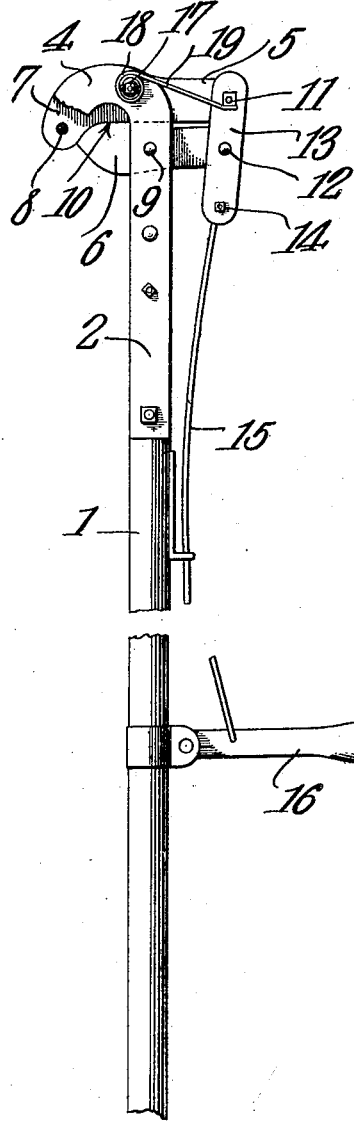
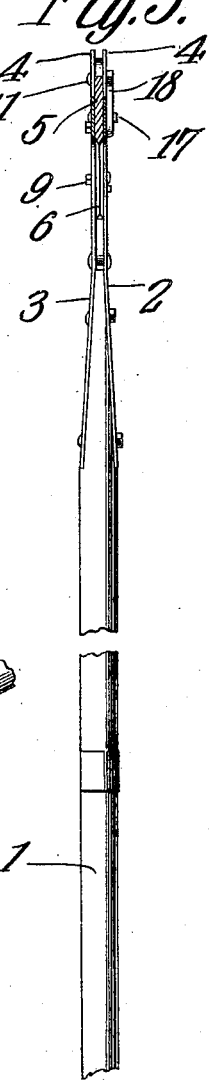
Inventor
August F. Mischke.

UNITED STATES PATENT OFFICE.

AUGUST F. MISCHKE, OF FREMONT, OHIO.

PRUNING-SHEARS.

No. 879,882.     Specification of Letters Patent.     Patented Feb. 25, 1908.

Application filed November 27, 1907. Serial No. 404,087.

*To all whom it may concern:*

Be it known that I, AUGUST F. MISCHKE, a citizen of the United States, residing at Fremont, in the county of Sandusky and State of Ohio, have invented new and useful Pruning-Shears, of which the following is a specification.

This invention relates to pruning shears; and has for its object to provide an implement of that type which is usually fastened to the end of a long pole provided at one end with a cutting mechanism operated by a rod, wire or other connecting means extending to a handle near its opposite end.

The particular object of this invention resides in the cutting mechanism which comprises two cutting blades movable between guide plates, one blade pivoted at an end and the other intermediate its ends. The adjacent free ends of the two cutting blades are connected by a link from which an operating wire extends to a handle on the lower end of the pole in convenient reach of a person using the implement. By this arrangement the cutting edges of the blades, when the handle is operated, are brought together and separated positively, both blades swinging on their pivots.

With this and other objects in view the invention comprises certain novel combinations of parts hereinafter described and pointed out in the claims, reference being made to the accompanying drawing, in which Figure 1 is a side elevation of the improved implement with the cutting blades in normal or open position. Fig. 2 is a similar view with the cutting blades closed. Fig. 3 is a view looking in the direction of the arrow A Fig. 1, a portion being shown in section on the line 3—3 of the same figure.

Similar reference numerals are used for the same parts on all the figures.

The numeral 1 indicates a pole of indefinite length, the upper end of which is flattened on opposite sides and beveled. Rigidly fastened to the flat sides are two like metal plates 2 and 3 spaced apart and extended above the top of the pole a suitable distance in parallel relation and ending in hooks 4. Between the spaced plates 2 and 3 are two cutting blades 5 and 6 the former or upper blade having one end 7 pivotally connected at 8 to the ends of the hooks 4 and extending thence between the plates to the opposite side of the pole. The lower blade 6 turns on a pivot bolt 9 passing through the straight portions of the plates below the hooks, and intermediate the ends of the blade. The lower blade 6 is in the same plane as the upper blade and projects beyond both edges of the plates 2 and 3. The inner, that is the end of the lower blade below the hook has its upper edge 10 convexly curved and sharpened to coact with the bottom edge of the upper blade 5 which is slightly incurved and also sharpened where it crosses the bend of the hooks 4.

The outer ends of the cutting blades 5 and 6 are pivotally connected by bolts 11 and 12 to a link 13 on each side of the blades, one only of said links being shown. These links project below the lower blade for a short distance and are there connected by a bolt or pin 14 to a rod, wire or chain 15 extending down one side of the pole 1 to a hand lever 16, pivoted to said pole, and connected thereto.

Projecting from the side of one of the hooks 4 is a pin 17 connected to which is the inner end of a helical spring 18, its outer end 19 extending tangentially towards the links 13 and seated against the under side of the bolt 11 or a pin projecting from one of said links. This spring serves to elevate the outer ends of the blades 5 and 6 and separate their cutting edges after the hand lever has closed them by a downward movement.

Having thus described my invention, what I claim as new and desire to secure by Letters-Patent is:

1. A pruning implement comprising two spaced plates parallel to each other and formed into hooks at their upper ends, a pair of cutting blades movable between said plates, one of said blades pivoted at its end between the ends of said hooks and the other blade pivoted intermediate its ends to the plates below the first mentioned blade, links pivoted to the projecting ends of said blades and an operating means pivotally attached to said links.

2. A pruning implement comprising two spaced plates parallel to each other and having their upper ends formed into hooks, an upper cutting blade pivoted at its end between the ends of said hooks and extending laterally between the hooks to and beyond the edges of said plates, a lower cutting blade pivoted between said plates intermediate its ends, one of said ends having a cutting edge to coöperate with the upper blade and the other end projecting laterally below the outer end of the upper blade, links pivoted to the outer ends of said blades, a pull rod pivoted to said links for closing the cutting edges of said blades and a spring for separating said cutting edges.

In testimony that I claim the foregoing as my own, I have hereto affixed my signature in the presence of two witnesses.

AUGUST F. MISCHKE.

Witnesses:
JOSEPH T. SCHWARTZ,
FRANK C. KISER.